(12) United States Patent
Birk et al.

(10) Patent No.: US 8,899,626 B2
(45) Date of Patent: Dec. 2, 2014

(54) ASSEMBLY WITH A SEAT BELT HEIGHT ADJUSTER AND SEAT BELT PRESENTER

(75) Inventors: Karl Birk, Ebersbach (DE); Martin Seyffert, Pfullingen (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 14/123,982

(22) PCT Filed: May 31, 2012

(86) PCT No.: PCT/EP2012/002301
§ 371 (c)(1),
(2), (4) Date: Feb. 11, 2014

(87) PCT Pub. No.: WO2012/167883
PCT Pub. Date: Dec. 13, 2012

(65) Prior Publication Data
US 2014/0175780 A1 Jun. 26, 2014

(30) Foreign Application Priority Data
Jun. 8, 2011 (DE) .......................... 10 2011 105 026

(51) Int. Cl.
*B60R 22/03* (2006.01)
*B60R 22/20* (2006.01)
(52) U.S. Cl.
CPC .............. *B60R 22/201* (2013.01); *B60R 22/03* (2013.01)
USPC ................... 280/801.2; 280/804; 297/481
(58) Field of Classification Search
CPC .......................... B60R 22/03; B60R 22/201
USPC ................... 280/801.2, 804; 297/481
See application file for complete search history.

(56) References Cited

U.S. PATENT DOCUMENTS

| | | | | |
|---|---|---|---|---|
| 4,600,217 A * | 7/1986 | Naumann et al. | ............. | 280/808 |
| 4,629,214 A * | 12/1986 | Fohl | ............................. | 280/808 |
| 4,679,821 A * | 7/1987 | Yamamoto et al. | ........... | 280/808 |
| 4,741,557 A * | 5/1988 | Jambor et al. | ............. | 280/801.2 |
| 7,121,375 B2 * | 10/2006 | Becker et al. | ................. | 180/268 |
| 8,590,934 B2 * | 11/2013 | Fruehauf et al. | ........... | 280/801.1 |
| 2004/0256167 A1 | 12/2004 | Becker et al. | | |

FOREIGN PATENT DOCUMENTS

| | | |
|---|---|---|
| DE | 3537519 | 4/1987 |
| DE | 3633902 | 7/1988 |
| DE | 3909364 | 9/1990 |
| DE | 19602021 | 12/1996 |
| FR | 2856024 | 12/2004 |

* cited by examiner

*Primary Examiner* — Drew Brown
(74) *Attorney, Agent, or Firm* — Tarolli, Sundheim, Covell & Tummino LLP

(57) ABSTRACT

In an assembly comprising a belt height adjuster (104) and a belt feeder for feeding a belt webbing (110) the belt feeder includes an arm (112) which is adapted to be moved, especially pivoted from a home position into a feeding position by means of a drive. The arm (112) is arranged at the belt height adjuster (104).

11 Claims, 5 Drawing Sheets

US 8,899,626 B2

ASSEMBLY WITH A SEAT BELT HEIGHT ADJUSTER AND SEAT BELT PRESENTER

RELATED APPLICATIONS

This application corresponds to PCT/EP2012/002301, filed May 31, 2012, which claims the benefit of German Application No. 10 2011 105 026.8, filed Jun. 8, 2011, the subject matter, of which are incorporated herein by reference in their entirety.

BACKGROUND OF THE INVENTION

The invention relates to an assembly comprising a belt height adjuster and a belt feeder for feeding a webbing of a seat belt.

So far belt feeders have primarily been employed in convertibles so that the seat belt can be reached more easily when getting into the car. In two-door vehicles a belt feeder can be easily mounted on the B-pillar. In four-door vehicles it is a problem, however, that the B-pillar has a very narrow design.

SUMMARY OF THE INVENTION

It is the object of the invention to provide a compact design for a belt feeder.

According to the invention, for this purpose an assembly comprising a belt height adjuster and a belt feeder for feeding belt webbing is used, wherein the belt feeder includes an arm adapted to be moved, especially pivoted from a home position into a feeding position by means of a drive and wherein the arm is arranged at the belt height adjuster. The space required for the belt feeder is clearly reduced in this way and the small space available for instance at a B pillar can be optimally used.

Advantageously the arm is fastened to a pivot point of a deflection fitting for the seat belt. This combination brings about further space savings.

The drive for the movement of the art can be arranged at the belt height adjuster so that it is moved along with the same.

It is also possible to arrange the drive separately from the belt height adjuster on the vehicle, especially on the B-pillar, and to transmit the force for moving the arm. Thus the drive can be arranged close to the bottom, for example, and can move the arm via a force transmission member located behind the pillar cover.

Preferably at least a force transmission member especially configured to exhibit tensile or compression stiffness is provided which transmits the movement between the drive and the arm. When the drive is not arranged at the belt height adjuster, the force transmission member has to be configured so that it compensates for a change in distance between the belt height adjuster and the drive when adjusting the belt height.

In particular when the drive is arranged at the belt height adjuster, also the force transmission member is advantageously arranged at the belt height adjuster.

The force transmission member can be, for example, a Bowden cable, a tie rod or a coupling bar.

When using a tie rod, a spindle drive is advantageously provided for moving the tie rod, wherein the spindle drive can also be used in force transmission members of different design.

The drive for moving the tie rod is preferably arranged to be stationary at the B-pillar separately from the belt height adjuster. A coupling between the tie rod and the drive is preferably only effectuated, when the drive is running so as to be capable of compensating for a height adjustment of the belt height adjuster.

When using a coupling bar, the latter is advantageously connected to an eccentric arranged at the belt height adjuster.

It is also possible to provide a gear unit or a worm gear transmitting the movement between the drive and the arm, wherein especially the gear unit or the worm gear is arranged at the belt height adjuster. In this case the assembly can have a very compact design.

Advantageously, the arm is permanently connected to the belt webbing, for example in the form of an eye so that upon moving or pivoting the arm the belt webbing is automatically transported along. Thus any further mechanism for seizing the webbing is not necessary which increases the compact design of the assembly.

The belt feeder is returned to its home position again after fastening the belt.

In particular the deflection fitting is fixedly mounted on the height adjuster and the webbing extends from the fitting to the belt feeder. The deflection fitting absorbing the force of the webbing consequently is not arranged at the belt feeder but at the height adjuster.

BRIEF DESCRIPTION OF THE DRAWINGS

Hereinafter the invention shall be explained in detail by way of several embodiments and with reference to the enclosed drawings in which.

DESCRIPTION OF EMBODIMENTS

Figure 1:
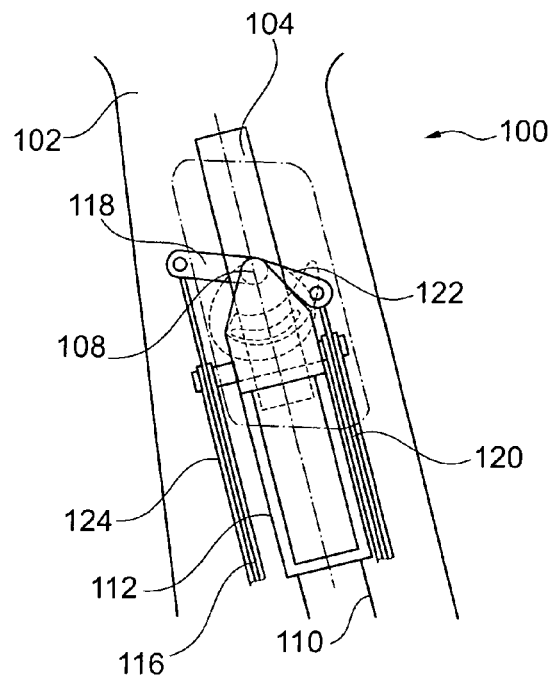
FIG. 1 shows a schematic view of an assembly according to the invention in accordance with a first embodiment.

FIG. 1 illustrates an assembly 100 in a first embodiment. At a B-pillar 102 of a car a belt height adjuster 104 (shown only schematically here) is arranged comprising a carriage movable in the longitudinal direction on which a deflection fitting 106 (see FIG. 3) is mounted at a pivot point 108. The webbing 110 of a seat belt extends through the deflection fitting 106.

An arm 112 of a belt feeder is movably mounted at the pivot point 108. The arm 112 includes a bearing plate 114 provided with an eye, the webbing 110 extending through the eye so that the arm 112 is permanently connected to the webbing 110.

Figure 2:
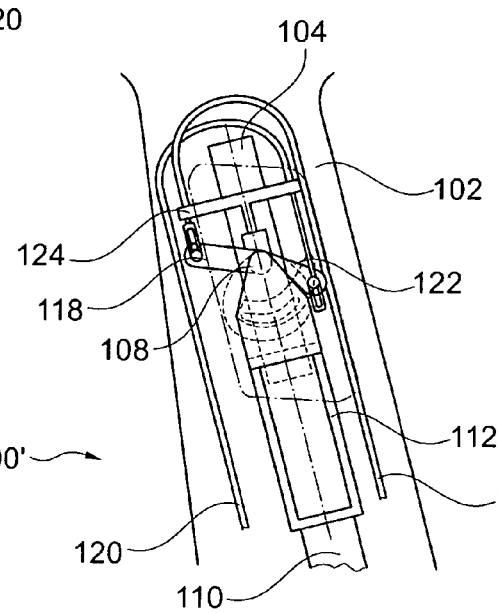
FIG. 2 shows a schematic view of an assembly according to the invention in a variant of the first embodiment.
Figure 3:
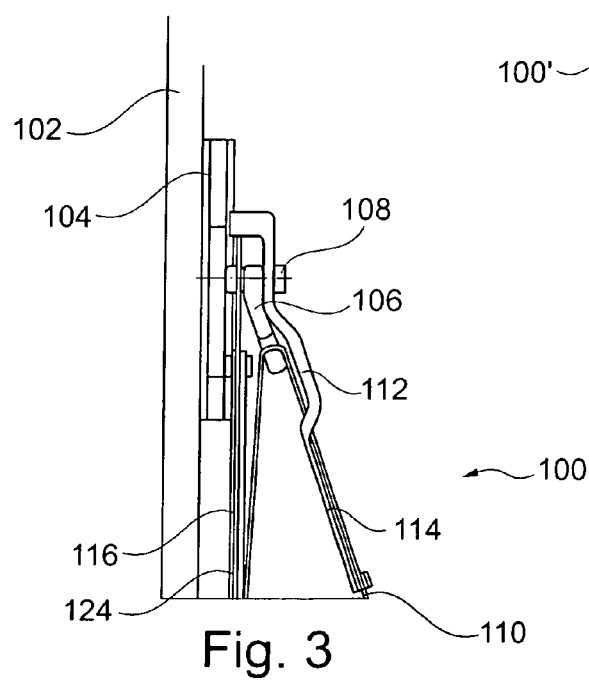
FIG. 3 shows a side view of the assembly from FIG. 1.

In a home position the arm 112 is aligned, as illustrated in FIGS. 1 to 3, in parallel to the B-pillar 102 and to the webbing extension. When a vehicle occupant gets into the vehicle, the arm 112 moves to the side into a feeding position so that the webbing 110 can be seized more easily by the vehicle occupant. This pivoting movement is shown for the second embodiment in FIGS. 4 and 5.

The force for pivoting the arm 112 is transmitted by a drive not shown here which is fixedly arranged on the B-pillar 102 to a laterally projecting lever arm 118 fixedly connected to the arm 112 via a force transmission member 116.

In the case shown here the force transmission member 116 is a Bowden cable.

The advantage of a flexible force transmission member which exhibits tensile and compression stiffness such as a Bowden cable consists in the fact that the changing distance between the fixedly installed drive and the arm 112 can be easily compensated upon activation of the belt height adjuster 104 when the deflection fitting 106 and thus also the pivot point 108 are moved along the B-pillar 102.

In the example of FIG. 1, a second force transmission member 120, in this case also in the form of a Bowden cable, which acts on a second lever arm 122 laterally projecting from the arm 112, is provided for resetting the arm 112. The second force transmission member 120 is equally connected to the drive (not shown here). It would also be possible to realize the reset by the effect of gravity or a spring or a reversibly movable drive.

The entire assembly except the arm 112 as well as the deflection fitting 106 is normally hidden below a cover of the B-pillar 102.

Instead of a simple pivoting, also a three-dimensional feeding movement of the arm 112 could be obtained by using a link guide (not shown).

When the arm 112 is uncoupled from the webbing 110 after fastening the belt by the arm 112 having an open holder for the webbing 110, the arm 112 is moved back after fastening the webbing 110. Otherwise the arm 112 remains in the feeding position which is already adapted to the belt extension.

The arm is especially made of flexible plastic material.

In general it is applicable that the features of the individual described embodiments can be exchanged for one another or combined with one another at the discretion of those skilled in the art.

FIG. 2 shows a variant of the just described embodiment in which the two force transmission members 116, 120 are acting from above on the lever arms 118, 122 and are guided around the belt height adjuster 104 in a curved shape. This design provides part of the length of the force transmission member 116 required to compensate the shifting movement of the belt height adjuster 104.

At the belt height adjuster 104 in both cases a guide 124 for a section of the force transmission member 116, 120 is arranged to which the end of the outer tube of the Bowden cable is fastened.

Figure 4:
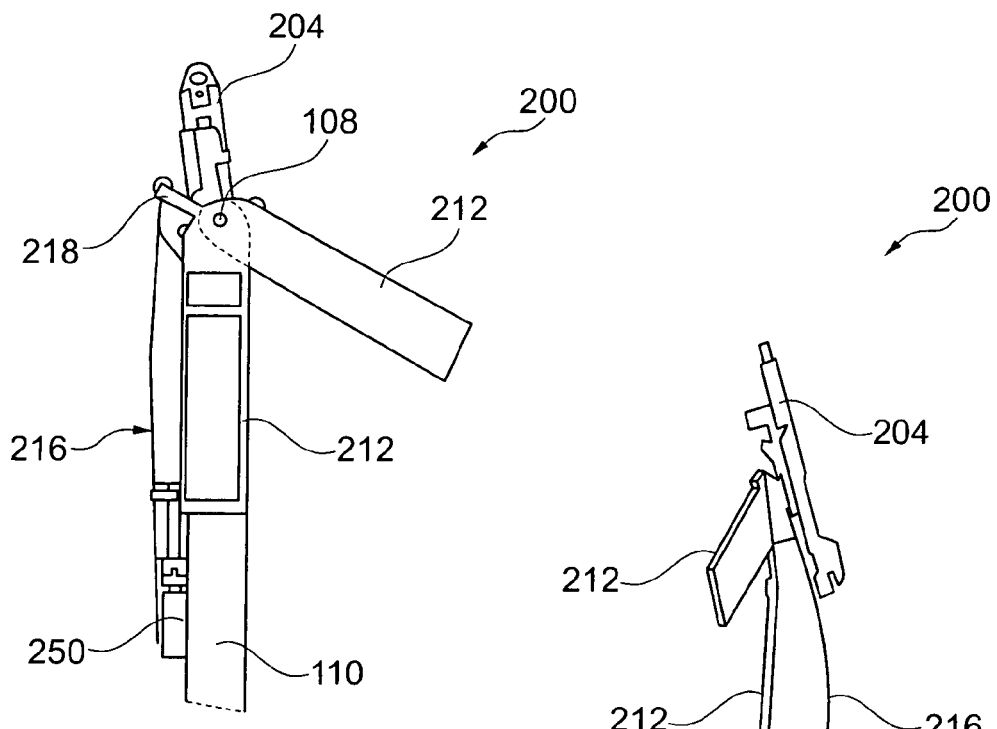
FIG. 4 shows a schematic view of an assembly according to the invention in a second embodiment.
Figure 5:
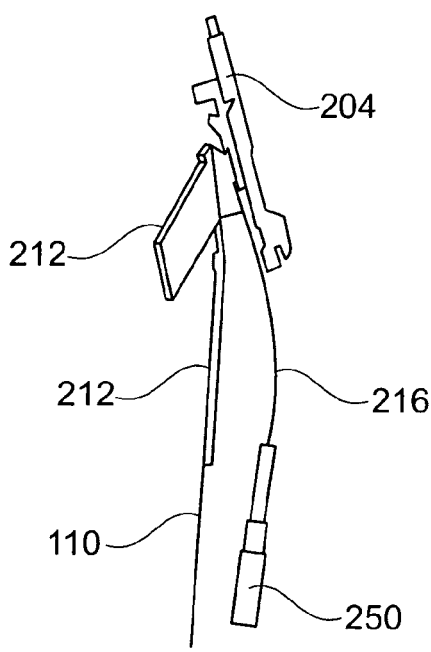
FIG. 5 shows a side view of the assembly from FIG. 4.
Figure 6:
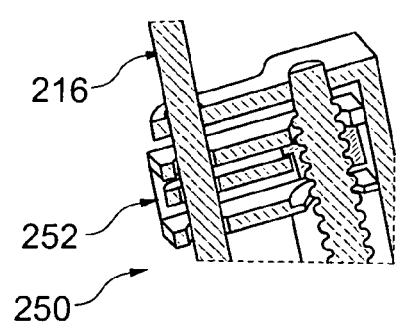
FIG. 6 shows a detailed view of a drive for the assembly from FIG. 4.

In FIGS. 4 to 6 a second embodiment of an assembly 200 comprising a belt height adjuster 204 and a belt feeder is illustrated. The arm 212 of the belt feeder is shown in this case both in the home position and in the feeding position.

In this case the lever arm 218 of the arm 212 is connected to a force transmission member 216 in the form of a tie rod adapted to be moved by a spindle drive 250 fixedly mounted on the B-pillar. For this purpose the spindle drive 250 includes a spindle nut having a driving tab 252 exhibiting a through hole through which the tie rod extends. The through hole is definitely larger than the tie rod. Upon activation of the spindle drive 250 the driving tab tilts and gets jammed at the tie rod.

Upon activation of the spindle drive 250 the tie rod is therefore entrained in both directions. In the home position of the arm 212, when the drive 250 is not activated, the driving tab 252 is arranged relative to the tie rod axis, however, such that the tie rod can move unhindered relative to the spindle drive 250 upon adjusting the belt height adjuster 204, which is enabled by the oversized through hole.

As a matter of course, also other mechanisms for entraining the tie rod are imaginable, for example two conical spring-loaded sleeves that clamp the tie rod upon activation of the spindle drive could be employed.

Figure 7:
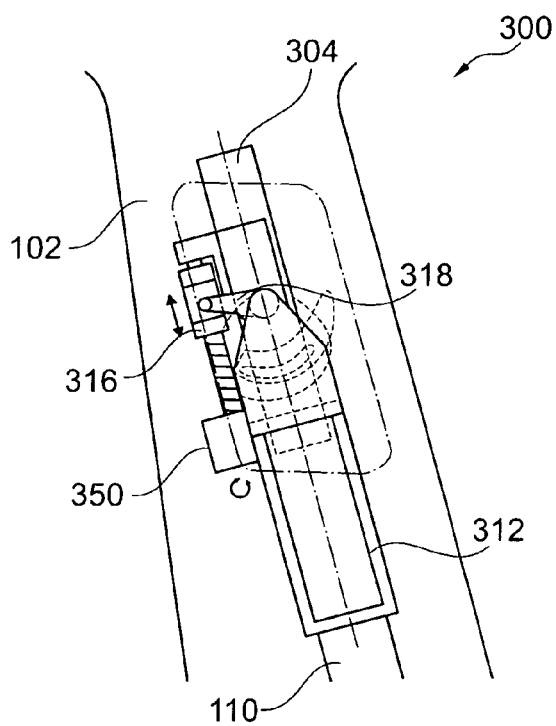
FIG. 7 shows a schematic view of an assembly according to the invention in accordance with a third embodiment.
Figure 8:
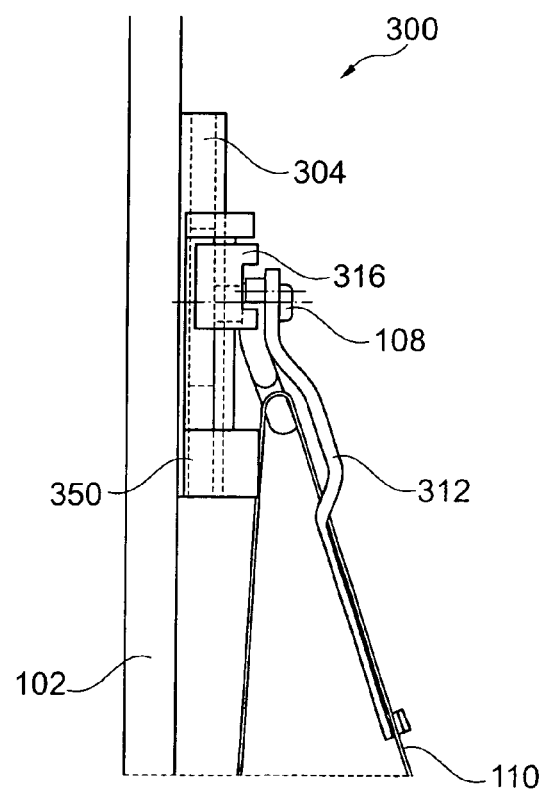
FIG. 8 shows a schematic side view of the assembly from FIG. 7.

In the third embodiment of an assembly 300 shown in FIGS. 7 and 8 a spindle drive 350 is arranged directly at the belt height adjuster 304. The lever arm 318 is directly connected to the spindle nut 316 so that the arm 312 is swiveled to the side in the feeding position upon a linear movement of the spindle nut 352.

Upon activation of the belt height adjuster 304 the spindle drive 350 is moved along, because it is fixedly connected to the former.

The spindle drive 350 can also be fastened to be stationary on the vehicle body, e.g. on the B-pillar. The connection between the spindle and the spindle drive in such case can be made via a flexible shaft. As an alternative, instead of the spindle and the flexible shaft also a pitch cable known per se, viz. a flexible spindle element, can be used for transmitting the rotation of the spindle drive to the spindle nut.

Figure 9:
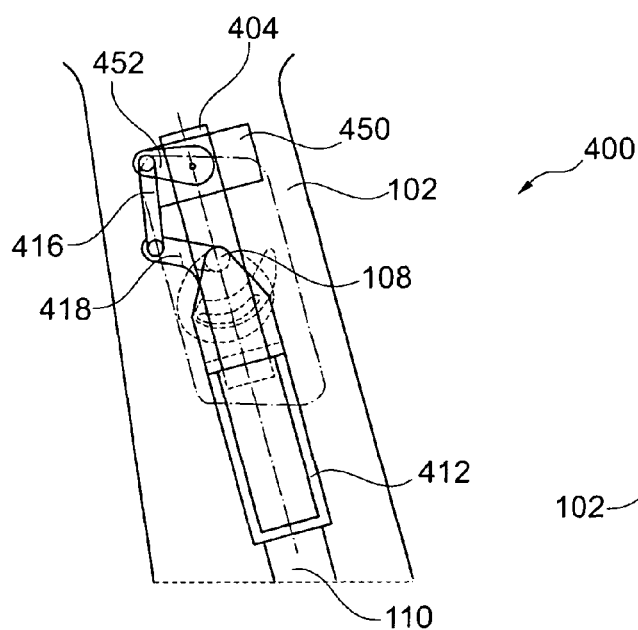
FIG. 9 shows a schematic view of an assembly according to the invention in accordance with a fourth embodiment.
Figure 10:
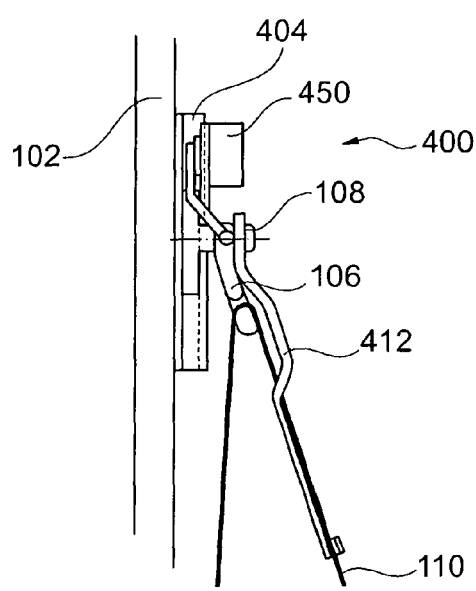
FIG. 10 shows a schematic side view of the assembly from FIG. 9.
Figure 11:
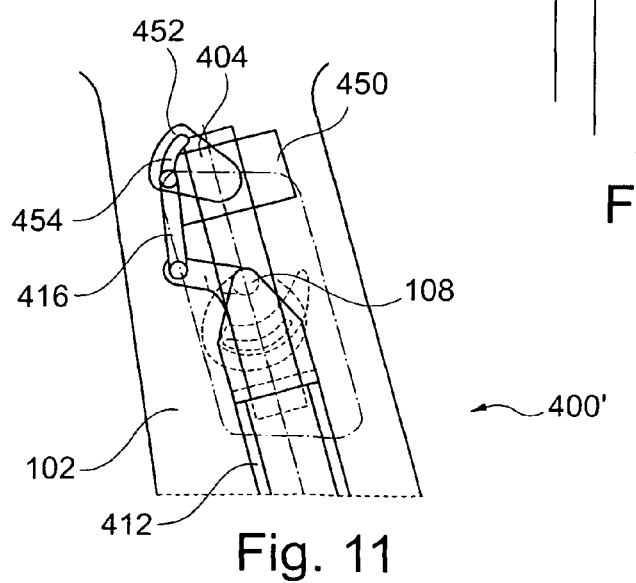
FIG. 11 shows a schematic view of an assembly according to the invention in accordance with a variant of the assembly shown in FIG. 9.

In the fourth embodiment of an assembly 400 illustrated in FIGS. 9 to 11 a drive 450 in the form of an electric motor is mounted directly on the belt height adjuster 404.

A force transmission member 416 in the form of a coupling rod connects an eccentric 452 at the shaft of the drive 450 to the lever arm 418 of the arm 412 of the belt feeder.

FIG. 11 shows a variant in which the eccentric 452 includes a link guide 454. The link guide 454 can have any complex design so that the arm 412 is adapted to perform a complex feeding movement.

Figure 12:
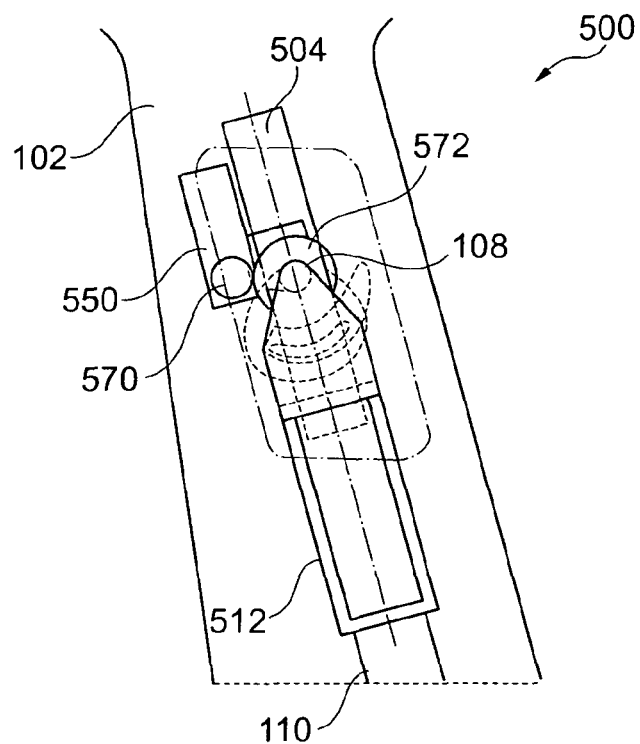
FIG. 12 shows a schematic view of an assembly according to the invention in accordance with a fifth embodiment.
Figure 13:
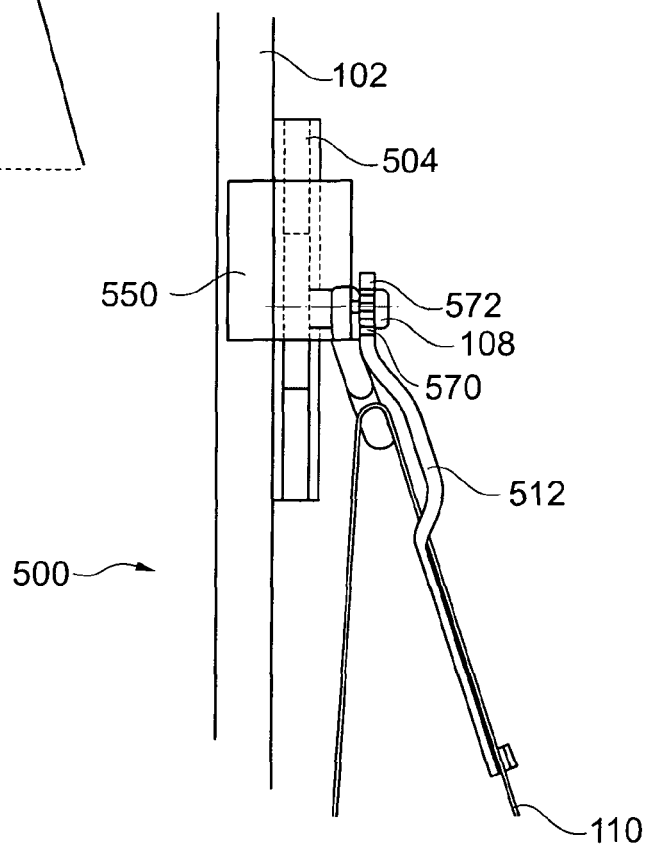
FIG. 13 shows a schematic side view of the assembly from FIG. 12.

In FIGS. 12 and 13 a fifth embodiment of an assembly 500 is shown in which a drive 550 in the form of an electric motor is arranged at the belt height adjuster 504 and is in direct connection with the arm 512 of the belt feeder. The motor can directly drive a worm gear 570 which entails pivoting of the arm 512 having an appropriate tooth system at an upper end 572. There can also be provided a transmission between the drive 550 and the upper end 572 of the arm 512 including the tooth system.

Both the deflection path and the deflection rates in the individual phases of belt feeding are directly predetermined in this embodiment by control of the drive 550.

The invention claimed is:

1. An assembly comprising a belt height adjuster (104-504) and a belt feeder for feeding a belt webbing (110),
wherein the height adjuster comprises a carriage which is movable in the longitudinal direction and on which a deflection fitting (106) (see FIG. 3) is mounted at a pivot point (108),
wherein the belt feeder includes an arm (112-512) which is adapted to be moved, especially pivoted from a home position into a feeding position by means of a drive (250-550) and the arm (112-512) is arranged at the belt height adjuster (104-504), and wherein the pivot point remains stationary when the arm is moved between the home position and the feeding position.

2. The assembly according to claim 1, wherein the arm (112-512) is mounted at the pivot point (108) of the deflection fitting (106).

3. The assembly according to claim 1, wherein the drive (350; 450; 550) for the movement of the arm (112-512) is arranged at the belt height adjuster (104-504).

4. The assembly according to claim 1, wherein at least one force transmission member (116; 120; 216; 316), especially a force transmission member exhibiting tensile or compression stiffness (116; 120; 216; 316) is provided for transmitting the movement from the drive (250-550) to the arm (112-512).

5. The assembly according to claim 4, wherein the force transmission member (116; 120; 216; 316) is arranged at the belt height adjuster (104-504).

6. The assembly according to claim 4, wherein the force transmission member (116; 120; 216; 316) is a Bowden cable, a tie rod or a coupling rod.

7. The assembly according to claim 6, wherein a spindle drive (250) is provided for moving the tension transmission member.

8. The assembly according to claim 6, wherein the coupling rod is connected to an eccentric (462) arranged at the belt height adjuster (404).

9. The assembly according to claim 4, wherein a gear unit or a worm gear is provided for transmitting the movement between the drive (550) and the arm (512), especially with the gear unit or the worm gear being arranged at the belt height adjuster (504).

10. The assembly according to claim 1, wherein the arm (112-512) is permanently connected to the belt webbing (110).

11. An assembly for a vehicle comprising:
a belt height adjuster having a carriage movable in a longitudinal direction relative to the vehicle;
a deflection fitting through which a belt webbing extends, the deflection fitting being pivotally connected to the carriage at a pivot point, the deflection fitting and the pivot point moving with the carriage relative to the vehicle;
a belt feeder having an arm for moving the belt webbing from a home position to a feeding position, the arm extending along the longitudinal direction when in the home position and extending transverse to the longitudinal direction when in the feeding position, the arm being arranged at the belt height adjuster; and
a drive that moves the arm between the home position and the feeding position, the pivot point on the carriage remaining stationary when the arm moves between the home position and the feeding position.

* * * * *